United States Patent [19]
Steele, Jr. et al.

[11] Patent Number: 5,862,376
[45] Date of Patent: Jan. 19, 1999

[54] SYSTEM AND METHOD FOR SPACE AND TIME EFFICIENT OBJECT LOCKING

[75] Inventors: Guy L. Steele, Jr., Lexington, Mass.; William N. Joy, Aspen, Colo.

[73] Assignee: Sun Microsystems, Inc., Mountain View, Calif.

[21] Appl. No.: 669,633

[22] Filed: Jun. 24, 1996

[51] Int. Cl.⁶ ........................................... G06F 9/46
[52] U.S. Cl. ........................................... 395/677; 395/672
[58] Field of Search .................................... 395/677, 672, 395/674

[56] References Cited

U.S. PATENT DOCUMENTS

| | | | |
|---|---|---|---|
| 5,274,809 | 12/1993 | Iwasaki et al. | 395/650 |
| 5,450,592 | 9/1995 | McLeod | 395/650 |
| 5,630,136 | 5/1997 | Davidson et al. | 395/676 |
| 5,682,537 | 10/1997 | Davies et al. | 395/726 |
| 5,761,659 | 6/1998 | Bertoni | 707/8 |
| 5,761,670 | 6/1998 | Joy | 707/103 |

*Primary Examiner*—Lucien U. Toplu
*Attorney, Agent, or Firm*—Gary S. Williams; Flehr Hohach Test Albritton & Herbert LLP

[57] ABSTRACT

In a system and method for managing repeated lock requests to synchronize an object with a particular thread, each lockable object has a lock datum and each thread can repeatedly request a lock for an object without knowing whether the thread is already synchronized with the object. Associated with each thread are a pair of locking registers and a pair of stack data structures. The registers reference the last object whose lock was acquired by the thread and contain a redundancy count indicating the number of consecutive lock requests for the object. The stack data structures contain references to other objects that are currently synchronized with the thread and an associated redundancy count for each such object. A locking procedure acquires the lock of an object only if a reference to the object is not contained in the registers or the stack data structures. For lock requests on objects that are already synchronized with the thread, the thread's locking registers and stack data structures are updated to reflect the additional lock request. An unlocking procedure releases an object's lock only when all lock requests for the object are relinquished by the thread.

14 Claims, 5 Drawing Sheets

Object data structure

```
Lock (C)
    Lock (B)
        Lock (A)
            Lock (A)
                Lock (A)
                    Lock (B)
                    Unlock (B)
                Unlock (A)
            Unlock (A)
        Unlock (A)
    Unlock (B)
Unlock (C)
```

SYSTEM AND METHOD FOR SPACE AND TIME EFFICIENT OBJECT LOCKING

The present invention relates generally to object-oriented computer systems in which two or more threads of execution can be synchronized with respect to an object, and particularly to a system and method for synchronizing threads with an object where a given thread may lock the same object repeatedly.

BACKGROUND OF THE INVENTION

In multiprocessor computer systems, software programs may be executed by threads that are run in parallel on the processors that form the multiprocessor computer system. As a result, a program may be run in parallel on different processors since concurrently running threads may be executing the program simultaneously. Moreover, if a program can be broken down into constituent processes, such computer systems can run the program very quickly since concurrently running threads may execute in parallel the constituent processes. Single processor, multitasking computer systems can also execute multiple threads of execution virtually simultaneously through the use of various resource scheduling mechanisms well known to those skilled in the art of multitasking operating system design.

The programs run on such computer systems are often object oriented. In other words, the threads executing the programs may invoke methods of objects to perform particular functions. However, some methods of some objects may be implemented only one at a time because of hardware or software constraints in the computer system. For example, an object may require access to a shared computer resource, such as an I/O device, that can only handle one access by one thread at a time. Thus, since concurrently running threads may concurrently seek to invoke such an object, the object must be synchronized with only one thread at a time so that only that thread has exclusive use to the object (i.e., only one thread at a time can own a lock on the object).

In the past, various approaches have been used to synchronize an object with a thread. These include the use of synchronization constructs like mutexes, condition variables, and monitors. When using monitors, each monitor identifies the thread that currently owns the object and any threads that are waiting to own the object. However, in the computer systems that employ these monitors there is often a monitor for every synchronizable object. As a result, this approach has the distinct disadvantage of requiring a large amount of memory.

A simple approach to reducing the memory required by these monitors is to allocate a cache of monitors and to perform a hash table lookup on each monitor operation. Such an approach can substantially increase the overhead of monitor operations, and the slow speed of this solution led to the present invention. Moreover, the use of a single-shared hash table in and of itself requires some synchronization among the threads. Contention for this shared resource can result in additional computational overhead.

Another approach to object locking requires only one bit per object. The bit is used as a "semaphore" having two states, "locked" and "unlocked." Two operations are provided on these semaphores: one waits until the bit is in the "unlocked" state and then sets it to the "locked" state, all as one atomic operation; the other resets the bit to the "unlocked" state. This simple approach is of limited use in a processing environment where within a single thread of execution, a procedure makes repeated requests to lock an object that is already synchronized with the thread. Often, it is desirable to write software in a modular fashion where in a single thread of execution many procedures may call one another. For reasons of software reliability and ease of verification, it is also desirable for each procedure to be coded in such a way that it locks any object it needs. Frequently one procedure calls another, and each requires the same particular object to be locked. If each procedure attempts to lock the same object using the simple semaphore procedure, the second attempt will fail because the object is already locked. For this reason, a desirable property of an object locking system is that an object may be locked more than once by the same thread, while other threads are prevented from locking the object until the object is completely unlocked.

It is also a desirable property of an object locking system that frequently occurring operations require few accesses to main memory.

It is an object of the present invention to provide an object locking system in which only one bit per object of memory overhead is imposed, as for the simple semaphore approach, while allowing any one thread to lock the same object more than once. In such a system an object is considered to be unlocked only if the thread has performed as many unlock operations on the object as it has performed lock operations.

It is another object of the present invention to provide a locking system that requires no data structures to be shared among threads for locking purposes other than the one bit per object already mentioned.

It is another object of the present invention to provide an object locking system and method that is computationally efficient in requiring no access to main memory, other than to the one bit of the object, when a requesting thread does not currently hold a lock on any objects and the object for which a lock is being requested is currently unlocked.

It is another object of the present invention to provide an object locking system and method that is computationally efficient in requiring no access to main memory at all when a requesting thread has already locked one or more objects and the object to be locked by the requesting thread is the one that was most recently locked by the requesting thread.

Other general and specific objects of this invention will be apparent and evident from the accompanying drawings and the following description.

SUMMARY OF THE INVENTION

In summary, the present invention is a multithreaded computer system having a memory that stores a plurality of objects and a plurality of procedures. Each object has a lock status of locked or unlocked. If an object is locked, then it is associated with a particular thread. That thread may perform many lock and unlock operations on the object. The lock status of the object will become unlocked only if and when the number of unlock operations performed by the thread on that object equals the number of lock operations performed by the thread on that same object. In normal operation of the system, a thread never performs an unlock operation on an object with which it is not currently associated.

There are two ways objects may be represented, either as a handle consisting of a data pointer to a data structure and methods pointer to a methods array, or as a direct pointer to an object data structure, the first element of which is a methods pointer to a methods array. For the purposes of the present invention, this representational difference is not significant.

The system associates one bit of storage, called a lock status bit, with each object for locking purposes. These bits may be stored in the objects themselves, in the handles, or in a separate table. For the purposes of the present invention, this representational difference is not significant. Two operations are used internally on such a lock status bit are: 1) a test-and-set operation, which sets the lock status bit to the "true" state and returns the previous state of the lock status bit, and performs this combination of steps in a manner that appears atomic to other threads; and 2) a clear operation, which sets the lock status bit to the "false" state.

Each thread has two data registers and two stack data structures associated with it for purposes of managing object locking. Other threads do not access these registers and stack data structures. A first one of the stack data structures stores object references, and the second stack data structure stores finite integer values indicating the number of lock requests made in succession for the corresponding object referenced in the first stack data structure. The two stack data structures are treated as part of the thread's state, and thus are swapped in and out along with other thread associated state information whenever the computer system's data processor switches context from one thread to another. A first one of the data registers stores an object reference, and the second data register (also known as the redundancy count register) stores a finite integer value indicating the number of lock requests made in succession for the corresponding object referenced in the first data register. The two data registers are used to store information that may be pushed onto the two stacks, to receive information popped from the two stacks, and to store information about the last object locked by the thread.

When a thread is created, the two stack data structures used for object locking purposes are allocated for it. When a thread is destroyed, the two stack data structures are deallocated and the associated memory space is recycled.

The system contains two procedures, one for locking an object and one for unlocking an object. The locking procedure synchronizes an object with a thread by acquiring its lock which then allows the thread to request the object's lock repeatedly. The unlocking procedure releases an object's lock when all lock requests for the object are relinquished. Lock requests can be successive requests to lock the same object (i.e., consecutively nested lock requests), requests to lock an object whose lock the thread has already acquired previously, and requests to lock an object that has not yet been synchronized with the thread.

When the locking procedure is invoked, the contents of the thread's registers indicate the object whose lock was last requested. If the lock request is for this object, the redundancy count register is incremented. Otherwise, a reference to the current object and a redundancy count of zero is placed in the thread's registers. If the thread is not currently synchronized with the object, the object's lock is acquired thereby giving the thread exclusive use to the object.

In releasing an object's lock, the current contents of the thread's registers contain a reference to the released object and the number of consecutively nested lock requests held by the thread. This number is decremented and if no more locks requests are outstanding, the lock on the object is released. Otherwise, the lock is maintained by the thread until all lock requests are relinquished.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The present invention pertains to a method and system for synchronizing an object with a thread. This synchronization is implemented through the use of a lock bit associated with an object that once obtained gives exclusive use (or sole access) to the object until the lock is released. In the context of the preferred embodiment, each thread of execution can execute a number of methods where each method can require synchronization to a particular object. It is often the case that each of the methods of a particular thread are not aware of the locks obtained by the other methods. It is the purpose of the present invention to provide a mechanism that manages the acquisition of object locks for each thread.

Figure 1:
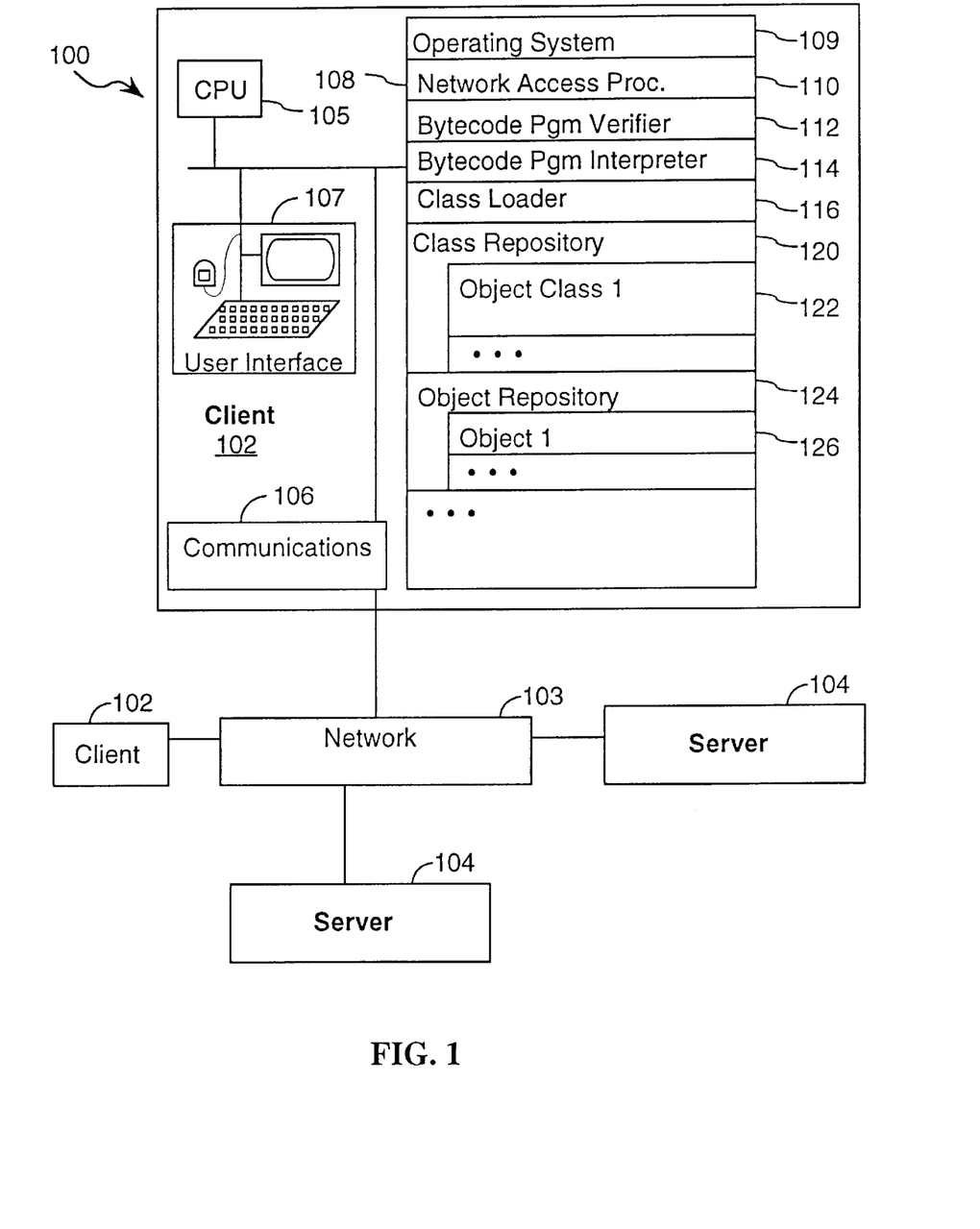
FIG. 1 a block diagram of a computer system incorporating a preferred embodiment of the present invention.

Referring to FIG. 1, there is shown a distributed computer system 100 having multiple client computers 102 and multiple server computers 104. In the preferred embodiment, each client computer 102 is connected to the servers 104 via the Internet 103, although other types of communication connections could be used. While most client computers are desktop computers, such as Sun workstations, IBM compatible computers and Macintosh computers, virtually any type of computer can be a client computer. In the preferred embodiment, each client computer includes a CPU 105, a communications interface 106, a user interface 107, and memory 108. Memory 108 stores:

an operating system 109;

an Internet communications manager program or other type of network access procedures 110;

a bytecode program verifier 112 for verifying whether or not a specified program satisfies certain predefined integrity criteria;

a bytecode program interpreter 114 for executing application programs;

a class loader 116, which loads object classes into a user's address space and utilizes the bytecode program verifier to verify the integrity of the methods associated with each loaded object class;

at least one class repository 120, for locally storing object classes 122 in use and/or available for use by users of the computer 102;

at least one object repository 124 for storing objects 126, which are instances of objects of the object classes stored in the object repository 120.

In the preferred embodiment the operating system 109 is an object-oriented multitasking operating system that supports multiple threads of execution within each defined address space. For the purposes of this document it may be assumed that all objects in the system 109 are lockable objects, although in practice relatively few objects are actually ever locked.

The class loader 116 is typically invoked when a user first initiates execution of a procedure, requiring that an object of the appropriate object class be generated. The class loader 116 loads in the appropriate object class and calls the bytecode program verifier 112 to verify the integrity of all the bytecode programs in the loaded object class. If all the methods are successfully verified an object instance of the object class is generated, and the bytecode interpreter 114 is invoked to execute the user requested procedure, which is typically called a method. If the procedure requested by the user is not a bytecode program and if execution of the non-bytecode program is allowed (which is outside the scope of the present document), the program is executed by a compiled program executer (not shown).

The class loader 116 is also invoked whenever an executing bytecode program encounters a call to an object method for an object class that has not yet been loaded into the user's address space. Once again the class loader 116 loads in the appropriate object class and calls the bytecode program verifier 112 to verify the integrity of all the bytecode programs in the loaded object class. In many situations the object class will be loaded from a remotely located computer, such as one of the servers 104 shown in FIG. 1. If all the methods in the loaded object class are successfully verified, an object instance of the object class is generated, and the bytecode interpreter 114 is invoked to execute the called object method.

Synchronized methods are defined for the purposes of this document to be methods that include using a locking methodology so as to limit the number of threads of execution (hereinafter "threads") that can simultaneously use a system resource. The most common synchronization tool is a mutex, which enables only a single thread to use a particular system resource at any one time, and which includes a mechanism for keeping track of threads of execution waiting to use the resource.

In the context of the preferred embodiment, a synchronized method is always synchronized on a specific object. For example, multiple threads may execute a number of synchronized methods that call for exclusive use of a system resource represented by a specific object. When any one of the threads has "possession" of the lock on the object, all other threads that request possession of the lock on the object are forced to wait until all the earlier threads get and then release the lock on the object.

Data Structures for Objects

Figure 2A:
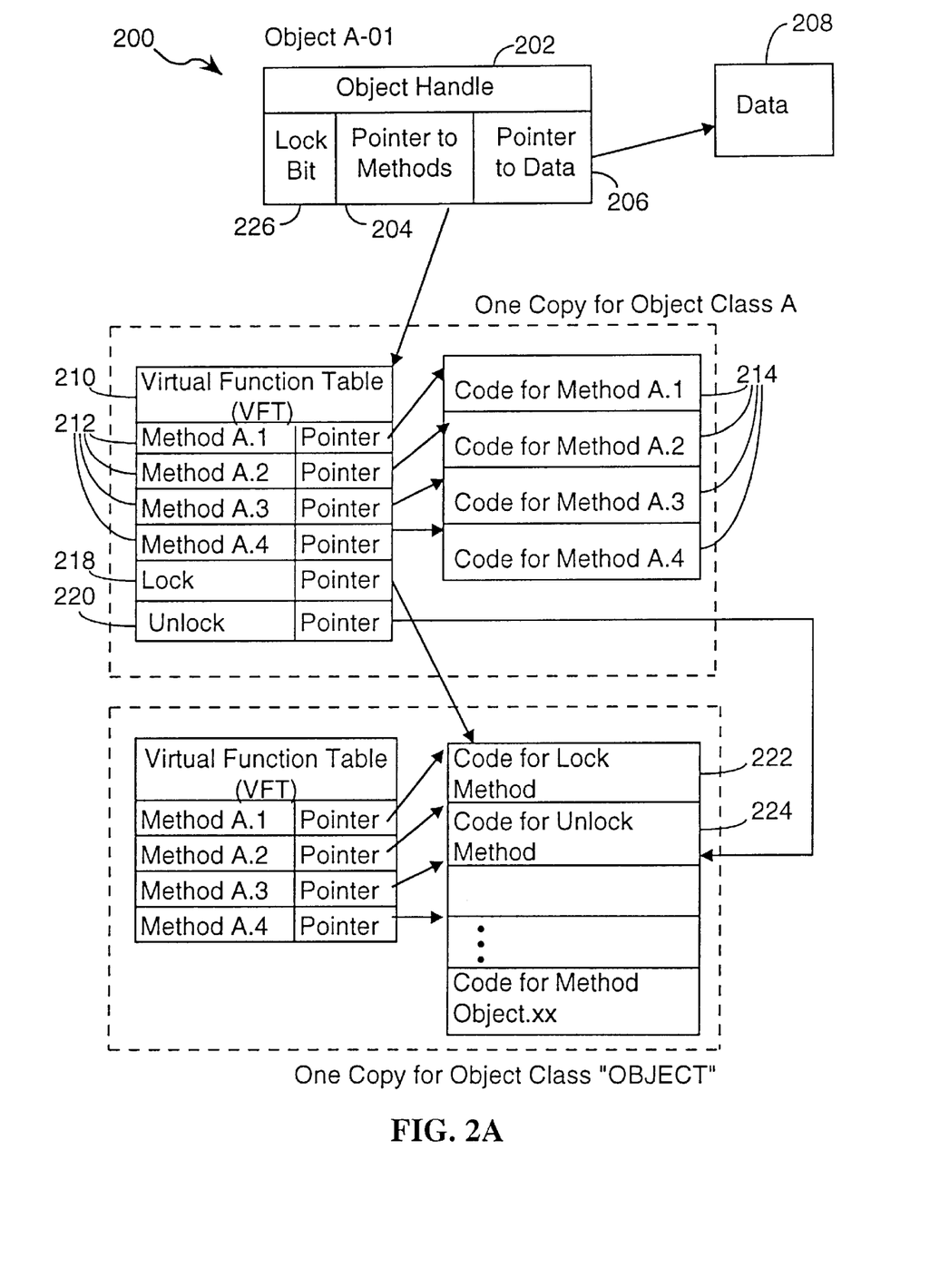
FIGS. 2A–B are block diagrams of the data structure for an object in a preferred embodiment of the present invention.
Figure 2B:
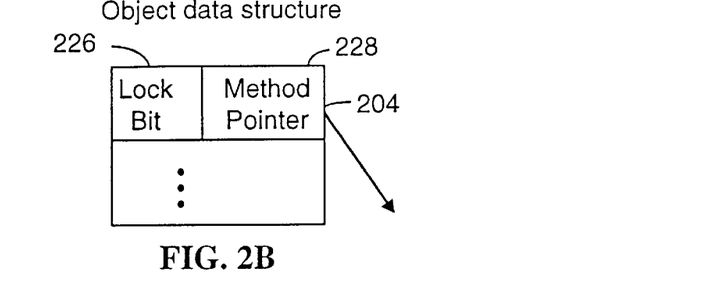

FIG. 2A shows the data structure for an object 200 in a preferred embodiment of the present invention. An object A-01 of object class A can be represented as an object handle 202. Object handle 202 consists of a data pointer 206 to a data structure 208, a methods pointer 204 to a methods array 210, and a lock bit 226. The lock bit 226 is a single bit of storage that indicates whether the associated object is synchronized with a particular thread. When the lock bit 226 is set to the "true" state (i.e., lock bit=1), the object is currently synchronized with a particular thread that has exclusive use (or sole access) to the object. An object having a lock bit 226 set to the "false" state (i.e., lock bit=0) indicates that the object is not synchronized with a particular thread. Alternatively, as shown in FIG. 2B, an object can be represented as an object data structure 228 consisting of a lock bit 226 and a methods pointer 204 to a methods array 210. For the purposes of the present invention, this representational difference is not significant.

The pointer 204 to the object's methods is actually an indirect pointer to the methods of the associated object class. More particularly, the method pointer 204 points to the Virtual Function Table (VFT) 210 for the object's object class. Each object class has a VFT 210 that includes: (A) pointers 212 to each of the methods 214 of the object class; (B) a pointer 218 to a global lock method (Lock) 222 for acquiring an object's lock; and (C) a pointer 220 to a global unlock method (Unlock) 224 for releasing an object's lock.

As shown in FIG. 2A, there is only one copy of the VFT 210 and the object methods 214 for the entire object class A, regardless of how many objects of object class A may exist. Furthermore, the global lock method (Lock) 222 and the unlock method (Unlock) 224 are methods of the "Object" object class, which is the object class at the top of the object class hierarchy in the preferred embodiment.

Figure 3A:
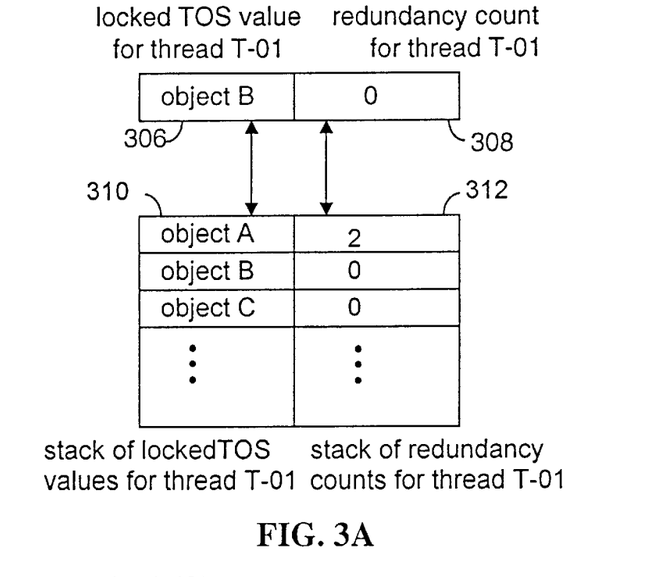
FIG. 3A is a block diagram of the object locking related data structures for a thread in a preferred embodiment of the present invention.
Figure 3B:
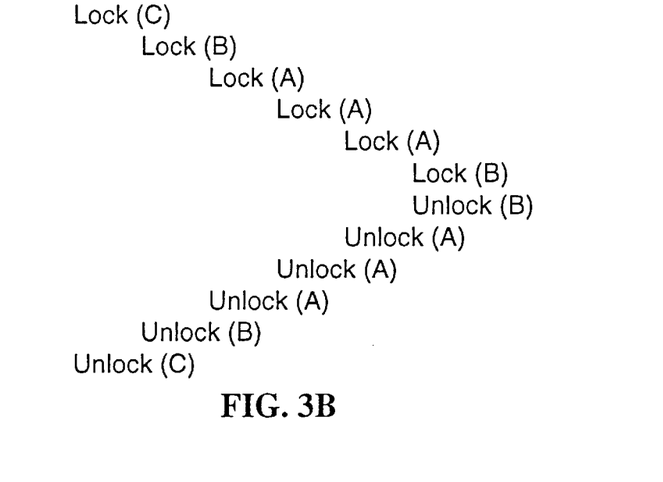
FIG. 3B shows a permissible sequence of lock and unlock requests.

FIG. 3A shows the data structures associated with each thread. FIG. 3A pertains to thread T-01 that has made a series of lock requests as shown in FIG. 3B. In the preferred embodiment, the methods associated with a thread can make several lock requests for various objects. The lock requests can be for objects not previously synchronized with the thread (e.g., the lock request for object C), can be repeated requests in succession for the same object resulting in consecutively nested lock requests (e.g., the lock requests for object A), and can be for an object whose lock the thread has previously acquired and which was not the immediately preceding lock request (e.g., the lock requests for object B).

Each thread has two data registers and two stack data structures associated with it for purposes of managing object locking. Other threads do not access the registers (otherwise referred to as the thread's locking registers) and the stack data structures. A lockedTOS register 306 is used to store a reference to an object that is synchronized with the thread (i.e., the object whose lock the thread has acquired). The redundancy count register 308 stores a finite integer value indicating the number of consecutively nested lock requests made by the thread for the object referenced in the lockedTOS register 306.

A first stack data structure 310, denoted as the stack of lockedTOS values, stores the contents of the lockedTOS register 306. The second stack data structure 312, denoted as the stack of redundancy counts, stores the contents of the redundancy count register 308. Each entry of the redundancy count stack 312 is paired with the corresponding entry of the lockedTOS stack data structure 310. Both stacks are operated in a Last-In-First-Out basis (LIFO) where at various points in the locking and unlocking procedures the contents of the lockedTOS 306 and redundancy count 308 registers are pushed onto and popped from the stacks accordingly. The lockedTOS 306 and redundancy count 308 registers are used to store the last object whose lock was acquired by the thread. As new lock requests are serviced, the contents of the thread's locking registers are pushed onto the stacks. As lock requests are released, information from the top of the stacks is popped into the registers.

The two stack data structures are treated as part of the thread's state, and thus are swapped in and out along with other thread associated state information whenever the computer system's data processor switches context from one thread to another.

The Object Locking Methodology

Each computer system, such as a client computer 102, has many objects, each having an associated object class. Every object is said to be an instance of its associated object class. Each object class inherits properties from its superclass, and every object class is a subclass of a top level object class called the "Object" object class.

For each object class that exists in a particular address space, there is a virtual function table (VFT) that contains a list of all the methods (i.e., executable procedures) associated with the object class as well as a pointer to each of those methods. As shown in FIG. 2A, the VFT for each object class also includes a reference to the Lock and Unlock method, which in the preferred embodiment is a method associated with the "Object" object class. Whenever an object requires synchronization with a thread, the Lock and Unlock methods associated with the "Object" object class are utilized.

Figure 4:
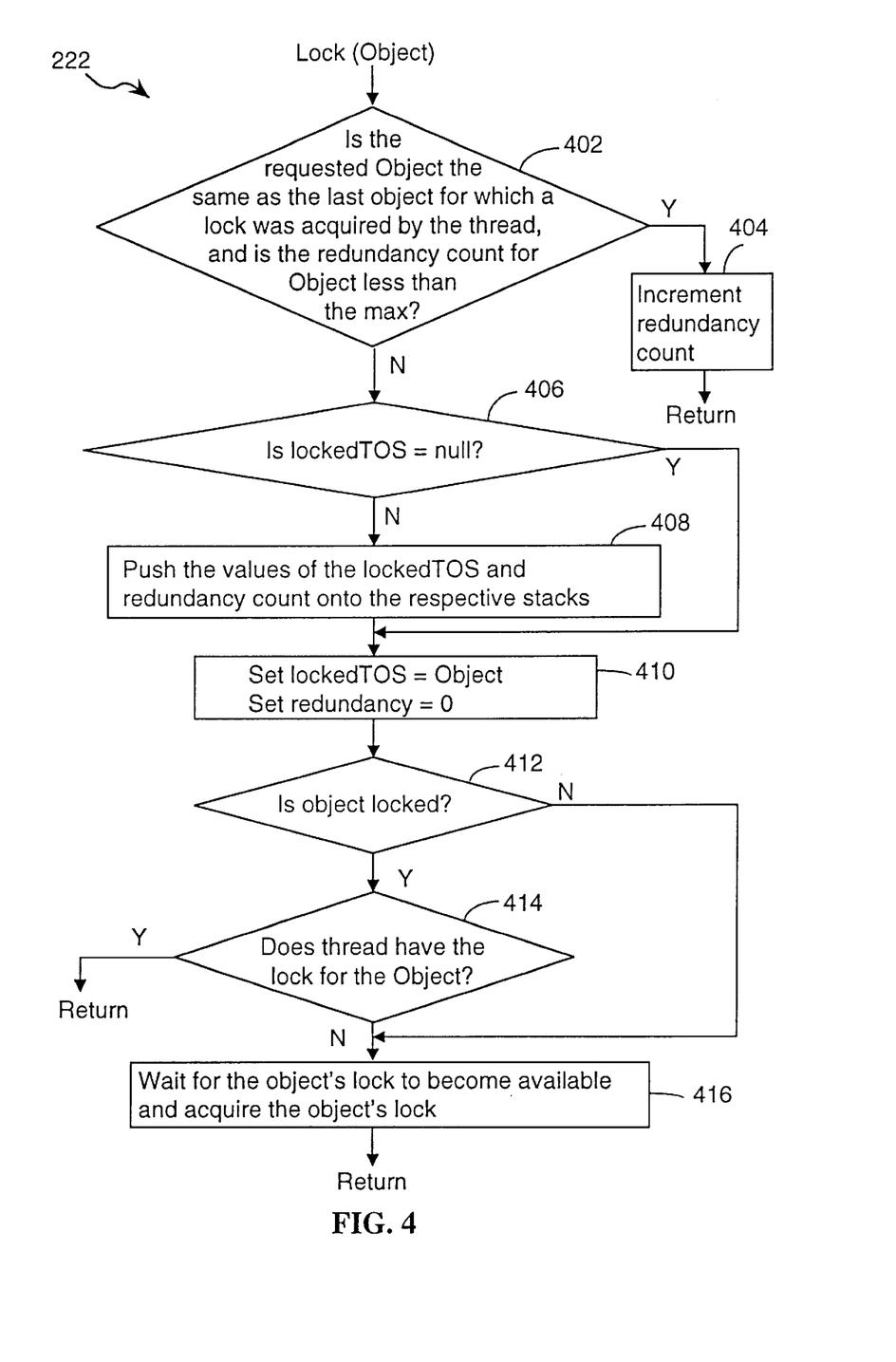
FIG. 4 is a flow chart of the procedure for locking an object in a preferred embodiment of the present invention.

FIG. 4 illustrates the procedure for locking an object in the preferred embodiment of the present invention. The objective of the locking procedure 222 is to synchronize an object with a thread. This synchronization is achieved when the thread acquires the object's lock (i.e., the lock bit). Once the object's lock is obtained, the thread has exclusive access to the object until the lock is released. However, the thread can request an object's lock without being aware of its synchronization status with the object. Therefore, the thread can make repeated lock requests in succession for the same lock (i.e., consecutively nested lock requests), request the lock of an object that it was synchronized with previously, although not the immediately preceding lock request, and request the lock for an object that the thread is not synchronized with.

For a consecutively nested lock request, the redundancy register is incremented since the lockedTOS register refers to the requested object. For a lock request on an object that the thread is already synchronized with, but which is not the same object for which a lock was last requested by the thread, the thread's locking registers are updated to indicate the additional lock on the object. Where the lock of an object is requested that is not yet synchronized with the thread, the thread's locking registers are updated to indicate the requested object and execution of the thread is suspended until the object's lock is acquired.

The locking procedure 222 proceeds by first determining if the object (sometimes called the "requested object") for which lock has been requested is the same as the last object for which a lock was previously acquired by the thread (step 402). This can be determined by checking the content of the thread's lockedTOS register. If the content of the lockedTOS register refers to the requested object, a further check is made to ensure that the redundancy count for the object is less than the maximum value (step 402). The maximum value for the redundancy count is constrained to the size of the register used to store the value. Preferably, a register of at least 32-bits is used, restricting the size of the redundancy count to the value of $2^N-1$ where N is the number of bits in the register used to store the redundancy count. If both of these conditions are satisfied, the redundancy count is incremented and the procedure returns (step 404).

If the requested object was not the last object for which a lock was previously acquired by the thread, the procedure clears the thread's locking registers in order to store new information in them. First, a check is made to determine if the registers are empty. This is done by testing if the contents of the lockedTOS register is null (step 406). If not (step 406-N), the current contents of the lockedTOS and redundancy count registers are pushed onto the respective stacks (step 408). Otherwise (step 406-Y), the procedure proceeds to step 410. Next, the requesting thread's lockedTOS register is set to reference the requested object and the redundancy count register is set to zero (step 410). In the preferred embodiment, the value of the redundancy count begins with zero, which indicates one reference to a corresponding object.

A further check is made to determine if the object is locked (step 412). An object is locked if its lock bit is set to "true." If the object is not locked (step 412-N), execution of the thread is suspended until the lock becomes available (step 416). In the preferred embodiment, an atomic test-and-set operation performed on the objects' lock bit is used to perform step 412, and to thereby determine if the lock on the requested object is available. A test-and-set operation is an atomic operation where in one indivisible step, the thread gains exclusive access to the lock bit (with respect to the other threads) and sets it to "true" when initially "false" and returns the previous state of the lock status bit. If the value of the lock status bit is already "true", the value "true" is returned without altering the current value. If the object is locked (step 412-Y), a further check is made to determine whether the requesting thread is the current owner of the object's lock (step 414). This can be ascertained by inspecting the object references stored in the stack of lockedTOS values for the requesting thread. If the requesting thread's lockedTOS stack does have a reference to the requested object reference (step 414-Y), the procedure returns. Otherwise (step 414-N), execution of the requesting thread is suspended until the object's lock become available and is acquired (step 416) through repeated use of the test-and-set operation.

Figure 5:
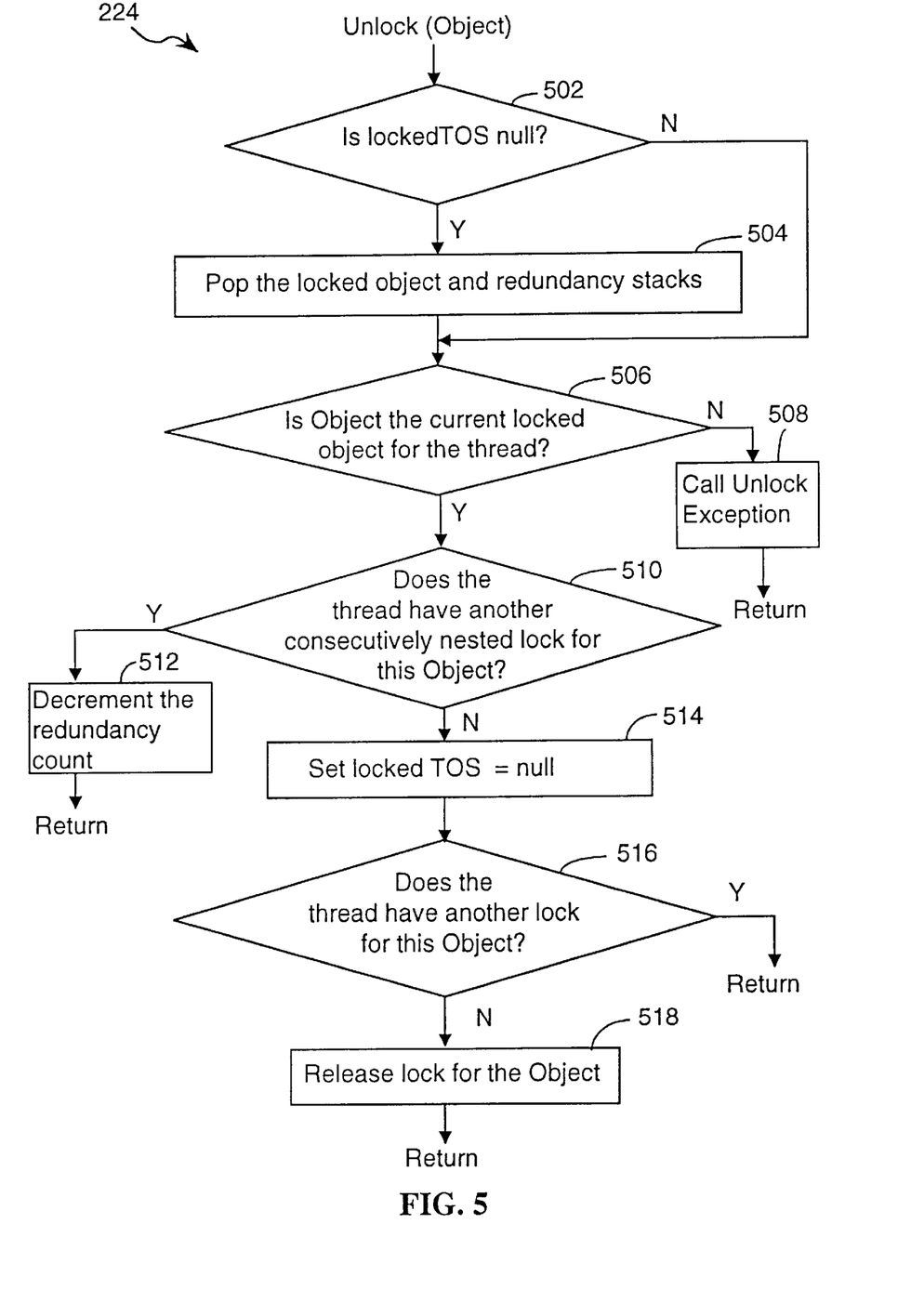
FIG. 5 is a flow chart of the procedure for unlocking an object in a preferred embodiment of the present invention.

FIG. 5 illustrates the procedure for unlocking an object in the preferred embodiment of the present invention. In the present invention, locks are released in the reverse order as they are requested (see FIG. 3B). In other words, the last lock obtained must be the first lock that is released and the first lock obtained must be the last lock to be released. Based on this assumption, the lockedTOS register always refers to the object for which a lock can be released next. Further, an object's lock is released when all outstanding lock requests (or accesses or uses) by the thread are released.

The unlocking procedure 224 proceeds by referring to the object referenced in the lockedTOS register since this should be the object for which a lock will be released. In order to refer to this object, a check is made to determine whether the lockedTOS is null (step 502). If so (step 502-Y), both stacks are popped and the respective values at the top of the stacks are placed in the appropriate thread's locking registers (step 504). However, if the stacks are empty, the stack pop instructions cause an error condition and an exception handling routine is invoked (not shown in the Figures). Next, a check is made to determine whether the object referenced in the lockedTOS register is the same as the one requested to be released (step 506). If not (step 506-N), an error has occurred and an exception handling routine is invoked (step 508).

Next, the procedure determines whether the thread has another consecutively nested lock request for this object (step 510). This determination can be made by checking if the value in the redundancy count register is greater than zero. If so (step 510-Y), the value in the redundancy count register is decremented (step 512) and the procedure returns. If not (step 510-N), the value of the lockedTOS register is set to null (step 514). This clears the values in the thread's locking registers since the current value in the redundancy count register is zero. Next, the procedure determines whether the thread has another lock request outstanding for this object (step 516). This determination can be made by searching the stack of lockedTOS values for the thread. If it is determined that the thread has other outstanding lock requests for the object, the procedure returns (step 516-Y). Otherwise, all accesses to the object have been relinquished and the object's lock can be released (step 518). This can be performed using an atomic operation that in one indivisible step gains sole access to the object's lock bit and clears its value (i.e., sets the lock bit to "false"). This enables the object to be synchronized with another thread.

The aforementioned system and method describes a mechanism for managing the locks of objects acquired by a thread in a computationally efficient manner. This mechanism utilizes a pair of registers and two stack data structures for each thread in order to track repeated requests by the thread for the same object. The use of the thread data structures minimizes the number of accesses to the object's lock especially for lock requests on objects that are already synchronized with the thread. The use of a single bit of storage for each object as the object's lock imposes minimal storage overhead for the object locking mechanism.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, the present invention is not limited to having the thread's data structures consist of two registers and two stacks. Other data structures and memory devices can be used that provide the same functionality.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed is:

1. A computer-implemented method for synchronizing objects with threads in a computer system having a plurality of threads and a memory storing a plurality of objects, a subset of the threads each requiring synchronization with various ones of the objects while performing predefined computational operations, said method comprising the steps of:

storing, for each said object, a synchronization datum indicating whether one of the threads is synchronized with said object;

storing, for each thread in said subset of said threads, a list of objects that the thread is synchronized with, said list including a number of synchronization actions by the thread with respect to each object with which the thread is synchronized;

when servicing a synchronization request by one of the threads for synchronization with one of the objects that is not synchronized with the one thread, synchronizing said one thread with the one object by setting the one object's synchronization datum and updating the one thread's synchronized object list accordingly;

when servicing a synchronization request by one of the threads for synchronization with one of the objects that is synchronized with the thread, updating the one thread's synchronized object list to indicate an additional synchronization action for the one object;

when servicing a request by one of the threads to release synchronization with one of the objects that is synchronized with the one thread, and the one thread's synchronized object list indicates more than one synchronization action for the one object, updating the thread's synchronized object list to reduce by one said number of synchronization actions for the one object; and when servicing a request to release synchronization with one of the objects that is synchronized with one of the threads, and the one thread's synchronized object list indicates exactly one synchronization action for the one object, desynchronizing the thread with said one object by resetting the one object's synchronization datum and clearing said one object from the one thread's synchronized object list.

2. The method of claim 1, each of the threads of the subset executing a plurality of methods that include instructions for requesting synchronization of the thread with ones of the objects.

3. The method of claim 1, wherein the synchronization datum is a lock; and wherein each request for synchronization with one of the objects is a request for exclusive ownership of the one object's lock; and wherein each request to release synchronization with one of the objects is a request to release the one object's lock if the requesting thread's synchronized object list indicates exactly one synchronization action for the one object.

4. A computer system, comprising:

a memory for storing a plurality of objects and for storing state information associate with a plurality of threads, each object having a lock status selected from the set consisting of locked and unlocked, the lock status of locked indicating that one of the threads is synchronized with and has sole access to the object, a subset of the threads including instructions to repeatedly request synchronization with specified ones of the objects, each thread in said subset of said threads including a data structure indicating objects the thread is synchronized with and a number of synchronization actions by the thread with respect to each object with which the thread is synchronized;

a first set of locking instructions, for execution upon request by any of the threads in said subset of threads, for changing the lock status of one of the objects to locked and for updating the data structure of a requesting one of said threads to indicate that the requesting one of said threads is synchronized with and has sole access to the one object;

a second set of locking instructions, for execution upon request by any of the threads in said subset of threads, for updating the data structure of the requesting one of the threads to reflect an increased number of synchronization actions by the one thread with respect to the one object;

a first set of unlocking instructions, for execution upon request by any of the threads in said subset of threads, for updating the data structure of the requesting one of the threads to reflect a decreased number of synchronization actions by the one thread with respect to the one object;

a second set of unlocking instructions, for execution upon request by any of the threads in said subset of threads, for changing the one object's lock status from locked to unlocked and for updating the data structure of the requesting one of the threads to reflect that the one thread is not synchronized with the one object;

wherein system uses said first set of locking instructions to service a request by one of the threads for synchronization with one of the objects, use said second set of locking instructions to service a request by one of the threads for synchronization with objects that the requesting thread already is synchronized with, uses said first set of unlocking instructions to service a request by one of the threads to release synchronization with one of the objects for which the requesting thread has a plurality of synchronization actions, and uses said second set of unlocking instructions to service a request by one of the threads to release synchronization with one of the objects for which the requesting thread has a single synchronization action.

5. The computer system of claim 4, further including a plurality of methods, executable by the threads of the subset, said plurality of methods including instructions for requesting synchronization of any one of the threads of the subset that executes said methods with ones of the objects.

6. A method for operating a computer system having a plurality of threads and a memory storing a plurality of lockable objects, a subset of the threads each requiring synchronization with various ones of the lockable objects while performing predefined computational operations, said method comprising the steps of:

(A) storing, for each said lockable object, a lock whose value indicates whether one of the threads has acquired said lock and has exclusive access to said object;

(B) storing, for each thread in said subset of said threads, a data structure for storing locked object data referencing objects whose locks have been acquired by the thread and a set of redundancy counts, each redundancy count indicating a number of requests by the thread for the lock of a corresponding object referenced by said locked object data;

(C) for each request by a thread to obtain the lock of one of objects:

(C1) determining whether the thread has already acquired the one object's lock;

(C2) if the thread has not already acquired the one object's lock, acquiring the one object's lock and updating the thread's locked object data and a corresponding redundancy count to indicate a single request for the lock of the one object;

(C3) if the thread has previously acquired the one object's lock, updating the thread's locked object data and a corresponding redundancy count to indicate an additional request for the lock of the one object;

(D) for each request by a thread to release the lock of one of the objects for which the thread has acquired the lock:

(D1) utilizing the thread's locked object data and a corresponding redundancy count to determine whether the number of requests for a lock of the one object is greater than one;

(D2) if the number of requests for a lock of the one object by the thread is equal to one, releasing the object's lock and updating the thread's locked object data and corresponding redundancy count accordingly; and (D3) if the number of requests for a lock of the one object by the thread is greater than one, updating the thread's locked object data and corresponding redundancy count to indicate a reduced number of requests for a lock of the one object by the thread.

7. The method of claim 6, said step C2 including storing a reference to the one object in the thread's locked object data and an initial redundancy count value in said corresponding redundancy count.

8. The method of claim 6, wherein the step C3 further comprises the steps of:

determining whether an immediately preceding lock request by the thread was for the lock on the one object;

if the immediately preceding lock request was for the lock on the one object, incrementing the redundancy count for the one object; and if the immediately preceding lock request was not for the lock on the one object, storing a reference to the one object in the locked object data and an initial redundancy count value in a corresponding one of the thread's redundancy counts.

9. The method of claim 6, wherein step D2 includes deleting a reference to the one object from the thread's locked object data.

10. The method of claim 6, wherein step D3 includes decrementing the thread's redundancy count for the one object.

11. The method of claim 6, wherein each thread's locked object data and redundancy counts are stored in data structures that are accessed in a last-in-first-out manner.

12. The method of claim 6, wherein each thread includes an executable instruction stream for accessing objects that are synchronized with the thread.

13. A computer program product for use in conjunction with a data processing system having a plurality of threads and a memory storing a plurality of lockable objects, a subset of the threads each requiring synchronization with various ones of the lockable objects while performing predefined computational operations, each thread of the subset of said threads including a data structure indicating objects the thread is synchronized with and a number of synchronization actions by the thread with respect to each object with which the thread is synchronized; the computer program product comprising a computer readable storage medium and a computer program mechanism embedded therein, the computer program mechanism comprising:

a first set of locking instructions, for execution upon request by any of the threads in said subset of threads, for changing the lock status of one of the objects to locked and for updating the data structure of a requesting one of said threads to indicate that the requesting one of said threads is synchronized with and has sole access to the one object;

a second set of locking instructions, for execution upon request by any of the threads in said subset of threads, for updating the data structure of the requesting one of the threads to reflect an increased number of synchronization actions by the one thread with respect to the one object;

a first set of unlocking instructions, for execution upon request by any of the threads in said subset of threads, for updating the data structure of the requesting one of the threads to reflect a decreased number of synchronization actions by the one thread with respect to the one object;

a second set of unlocking instructions, for execution upon request by any of the threads in said subset of threads, for changing the one object's lock status from locked to unlocked and for updating the data structure of the requesting one of the threads to reflect that the one thread is not synchronized with the one object;

wherein system uses said first set of locking instructions to service a request by one of the threads for synchronization with one of the objects, use said second set of locking instructions to service a request by one of the threads for synchronization with objects that the requesting thread already is synchronized with, uses said first set of unlocking instructions to service a request by one of the threads to release synchronization with one of the objects for which the requesting thread has a plurality of synchronization actions, and uses said second set of unlocking instructions to service a request by one of the threads to release synchronization with one of the objects for which the requesting thread has a single synchronization action.

14. The computer program product of claim 13, wherein each thread's data structure is accessed by said sets of locking and unlocking instructions in a last-in-first-out manner.

\* \* \* \* \*